United States Patent [19]

Bedolo

[11] Patent Number: 4,506,515

[45] Date of Patent: Mar. 26, 1985

[54] REFRIGERATING-CYCLE HEAT PUMP PURIFYING SYSTEM FOR CONDENSABLE GASEOUS MIXTURES OF DRY-CLEANING PLANTS

[76] Inventor: Orlando Bedolo, Via Turazza, 2, 35100 Padova, Italy

[21] Appl. No.: 403,984

[22] Filed: Aug. 2, 1982

[30] Foreign Application Priority Data

Aug. 10, 1981 [IT] Italy .............................. 41628 A/81

[51] Int. Cl.$^3$ ........................ F25D 17/06; F25B 21/06

[52] U.S. Cl. .......................................... 62/93; 62/278; 62/434; 34/75; 55/80

[58] Field of Search ................. 62/201, 436, 435, 434, 62/173, 428, 278, 277, 90, 93, 95, 96, 98, 99; 55/80, 81, 209; 165/30, 65; 34/27, 32, 72, 73, 74, 75, 76, 77

[56] References Cited

U.S. PATENT DOCUMENTS

| | | | |
|---|---|---|---|
| 2,392,405 | 1/1946 | Phipps | 62/90 X |
| 2,726,658 | 12/1955 | Chessey | 62/434 X |
| 2,876,630 | 3/1959 | Boling | 62/278 X |
| 2,928,258 | 3/1960 | Mann et al. | 62/155 X |
| 4,053,990 | 10/1977 | Bielinski | 34/27 X |

*Primary Examiner*—Harry B. Tanner

*Attorney, Agent, or Firm*—Guido Modiano; Albert Josif

[57] ABSTRACT

The system comprises a sequential set of heat exchangers, wherethrough a gaseous mixtures to be treated is forced to flow.

An initial length of the set provides for the cooling of the mixture by means of a refrigerating system such that the condensable products are liquefied and recovered; thereafter, residual purified air is heated by the heat generated in the codenser of the refrigerating system operating as a heat pump.

The system is specially useful for purifying the effluents of dry-cleaning plants utilizing chlorinated solvents.

5 Claims, 5 Drawing Figures

29
27
26
10
6
28
7
8
30
18
21
5
23
24
C
8
9
11
5
20
21
20
25
4
A
3
21

REFRIGERATING-CYCLE HEAT PUMP PURIFYING SYSTEM FOR CONDENSABLE GASEOUS MIXTURES OF DRY-CLEANING PLANTS

BACKGROUND OF THE INVENTION

This invention relates to a refrigerating-cycle heat pump purifying system, specially suitable for treating gaseous mixtures which contain condensable products, such as the gaseous effluent of dry-cleaning plants using chlorinated solvents.

Dry-cleaning equipment discharge gaseous mixtures at each cycle end, wherein air is admixed with solvents of the chlorinated variety.

Such effluents cannot be released to the atmosphere, thereby it becomes necessary to purify them and recover condensable products for re-use of such solvents and saving on them.

In accordance with prior techniques, said purification can be effected either by filtering or condensing processes.

The filtering involves high costs, in that the rectants or absorbents employed require replacement at short frequency intervals.

On the other hand the condensing allows the recovery of the solvents by condensation, wherein the gaseous effluents are cooled to a low temperature in heat exchangers, with attendant high refrigerating power requirements.

The treated air must then be heated for reintroduction into the equipment, such as not to produce an excessive thermal unbalance.

This latter operation reflects in additional power consumption.

SUMMARY OF THE INVENTION

Accordingly the task of this invention is to provide a highly effective purifying system, which allows the recovery of the condensable products contained in gaseous effluents.

Within this task it is an object of the invention to provide a system with low power requirements, by utilizing for the various treatment steps the absorbed energy, while limiting possible dissipation.

A further object is that of providing a system which is constructionally simple and non-critical in operation.

The above task and objects as well as yet other objects, such as will be apparent hereinafter, are achieved by a refrigerating cycle heat pump purifying system for condensable gaseous mixtures, characterized in that it comprises at least a first gas/air mixture pre-cooling heat exchanger and a second cooling heat exchanger serially connected to the first, both said heat exchangers being cooled by a refrigerating unit, at least a third purified air heating heat exchanger serially connected to said second heat exchanger and being heated by the condenser of said refrigerating unit operating as a heat pump, means being provided for periodical de-frosting and for temperature control.

BRIEF DESCRIPTION OF THE DRAWINGS

Further features and advantages of the invention will be more clearly understood from the following detailed description of a preferred embodiment thereof, given herein by way of illustration and not of limitation, with reference to the accompanying drawings, where.

DESCRIPTION OF THE PREFERRED EMBODIMENTS

Figure 1:
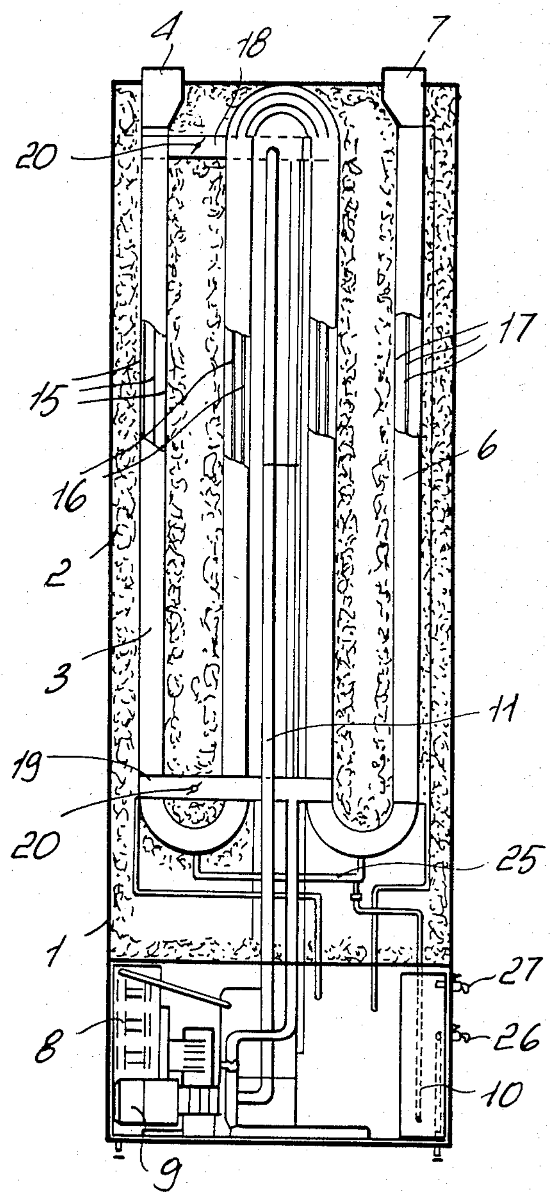
FIG. 1 is a partly sectional general view of a machine implementing the system according to the invention.

With reference to the drawing figures, a container-frame 1, thermally insulated with conventional materials 2, encloses:

a first heat exchanger 3 which is affected by the gaseous effluents admitted from a line 4 connected, to dry-cleaning equipment utilizing chlorinated solvents of the type of perchloroethylene;

a second heat exchanger 5 comprising two parts laid side-by-side and parallel to each other, which are interconnected as relates to the the path of flow of the gaseous effluents to said first exchanger 3;

a third heat exchanger 6, also serially connected to the former exchangers, which reintroduces, through a conduit 7, the now purified air into the dry-cleaning equipment;

a refrigerating unit 8;

a circulation pump 9;

a condensate collecting tank 10;

a cold fluid accumulator reservoir 11.

Figure 2:
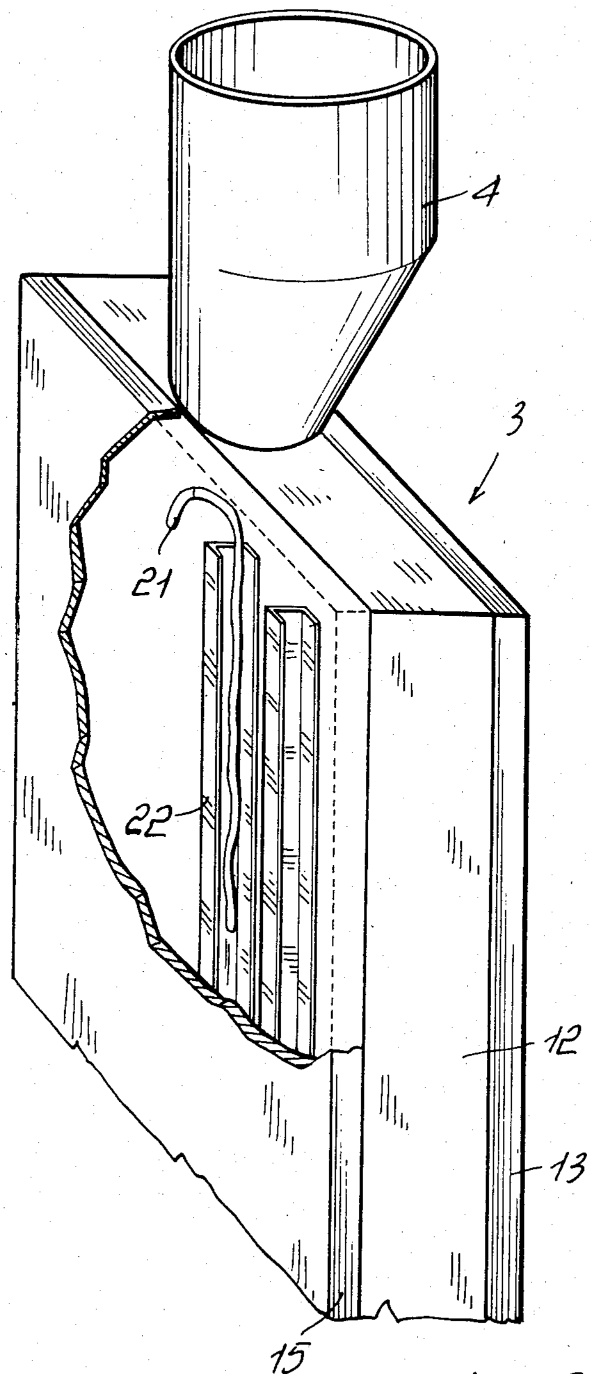
FIG. 2 is a first sectional view showing the configuration of the heat exchangers.
Figure 3:
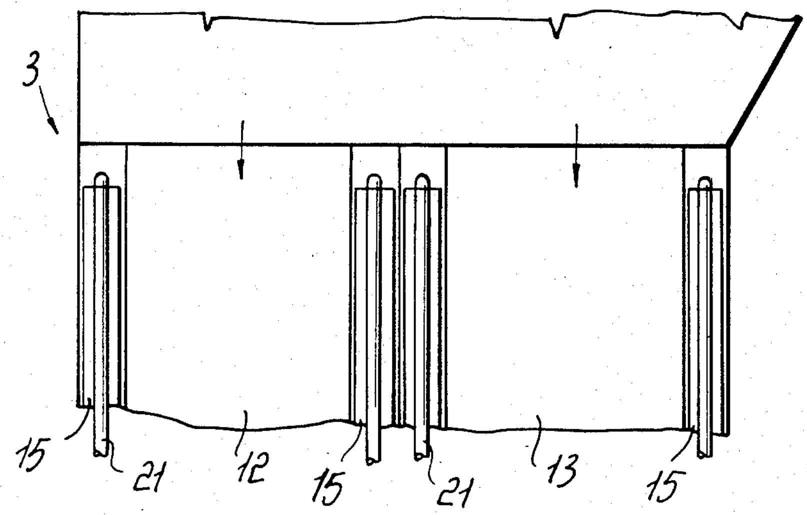
FIG. 3 is a second view of said heat exchangers.
Figure 4:
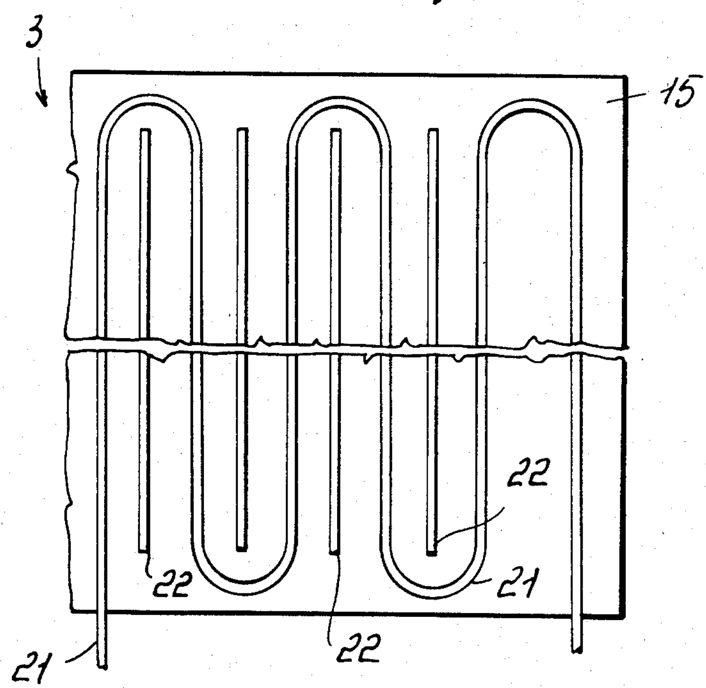
FIG. 4 is a third view of said heat exchangers.

Each heat exchanger, e.g. the first, indicated at 3 in FIGS. 2,3 and 4, comprises two parallel pathways 12 and 13, wherethrough the gaseous effluents from the conduit 4 are flown.

Each of said two pathways 12 and 13, forming essentially a rectangular cross-section conduit, is enveloped by chambers, respectively 15 for the heat exchanger 3, 16 for the heat exchanger 5, and 17 for the heat exchanger 6, which chambers contain a high thermal capacity fluid such as a glycol.

The chambers 15 and 16 contain a cold glycol, and their upper and lower sections are interconnected by two headers, respectively 18 and 19, with the interposition of flow throttling valves 20.

Within said chambers 15 and 16, there is accommodated a de-frosting coil 21 extending in a twisting pattern between two spacer baffles 22.

The two headers 18 and 19 are connected to a hydraulic circuit 23, which couples them to said cold accumulator reservoir 11 with the interposition of said circulation pump 9.

Figure 5:
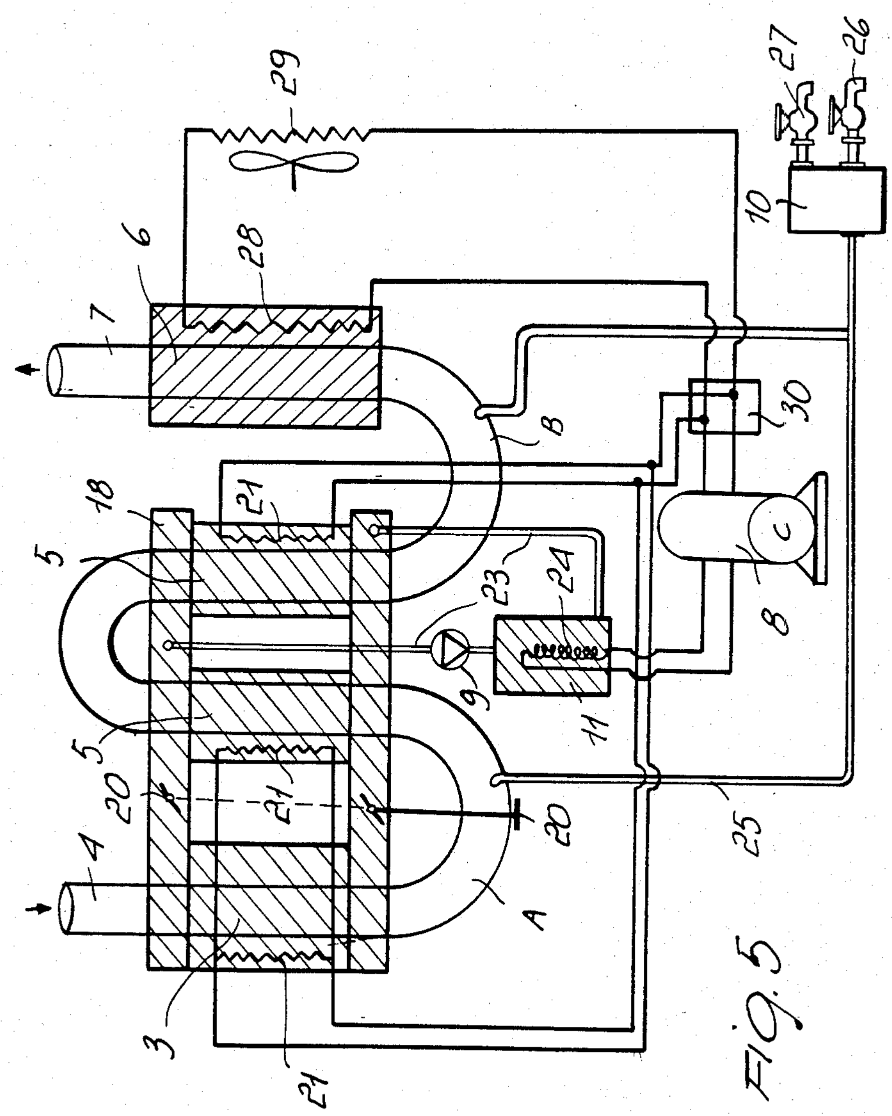
FIG. 5 is a general view of the system.

Reference should be had now to the general operation diagram shown in FIG. 5: the refrigerating unit 8 has its evaporator 24 immersed in the cold accumulator reservoir 11, and cools the glycol contained therein to a very low temperature, the glycol being circulated by means of the pump 9 through the heat exchangers 3 and 5 to cool the gaseous effluents and liquefy condensable products which, through conduits 25, are conducted into the collecting tank 10, where they will stratify and separate into condensation water and chlorinated solvents to be tapped periodically off two cocks 26 and 27.

The valves 20, which may be either manually operated or motor-operated and interlocked with a temperature control, control the circulation of the glycol through the first heat exchanger such that at the point A (lowest point in the heat exchanger 3) there are about 0° C., and at the point B (lowest point in the heat exchanger 5) there are about −20° C.

The heat exchanger 6 also contains glycol and a pipe coil 28 to the same pattern as the ones described hereinabove, which constitutes the refrigerating fluid condenser and heats the purified air to a temperature of about 10° C.

Serially connected to said pipe coil 28 are provided means of cooling 29 located between the condensor and the refrigerator of the refrigerating unit refrigerating gas, which would become operative where the refrigerating gas is not sufficiently cooled in the heat exchanger 6. The means of cooling 29 comprising a fan 40 aiding with a coil 41.

With this system, the refrigerating unit also operates as a heat pump, by removing low temperature heat from the gaseous effluents during the first treatment step in the heat exchangers 3 and 5, and pumping said heat at a much higher temperature which enables the now treated air to be heated.

From the condenser circuit, through a timed valve 30, hot fluid is supplied periodically through the pipe coils 21 (with the circulation pump 9 inoperative), to allow temporary heating of the walls of the heat exchangers 3 and 5 and the liquefying and collecting of the frost as it is formed.

It will be appreciated from the foregoing description how the peculiar construction of the system allows the refrigerating unit to be utilized both as a generator of cold which is first accumulated and then utilized in the heat exchangers, and as heat pump which affords the possibility of using the heat generated by the refrigerating cycle to heat the outlet air and de-frost the system whenever required.

Thus, it is apparent that the invention achieves all its objects, and in particular that the amount of heat involved can be utilized in a rational and economical way.

Of course, based upon the same inventive concept as outlined hereinabove, other different embodiments of the inventive system are possible without departing from the invention scope.

The materials and dimensions may be selected as desired to meet specific requirements.

I claim:

1. A refrigerating-cycle heat pump purifying device for condensable gaseous mixtures circulating in a dry cleaning plant, comprising:

a pipe coil, in which said gaseous mixture can circulate;

a series of enveloping chambers, in which portions of said pipe coil are housed;

a refrigerating unit including a compressor, a condenser and an evaporator;

a main duct serially connected said condenser, said evaporator and said compressor for circulating a refrigerating fluid;

a tank for housing said evaporator;

a delivery and return piping for connecting a high thermal capacity fluid in said tank with said enveloping chambers;

a pump on said delivery pipe, for pumping the fluid from said tank into said chambers and for having said fluid returned through said return pipe to said tank;

a heat exchanging chamber housing the end portion of said pipe coil and said condenser, in which chamber said high thermal capacity fluid is contained, said fluid being heated by said condenser and yielding heat to said end portion of said coil;

defrosting coils arranged and immersed in said high thermal capacity fluid in said enveloping chambers;

and an additional duct connecting in a parallel arrangement said defrosting coils with said main duct through a commuting valve.

2. A refrigerating-cycle heat pump purifying device, as claimed in claim 1, comprising:

a reservoir, discharge pipes connected with bottom portions of said pipe coil and with said reservoir, for drawing said gaseous mixture and coveying it to said reservoir, for further purifying handling, and outlet means arranged at two different heights in said reservoir, for discharging separately condensed water from condensed solvent.

3. A refrigerating-cycle heat pump purifying device, as claimed in claim 1, comprising furthermore a cooling coil on said main ducts, and a fan in correspondence with said cooling coil, for cooling said refrigerating fluid.

4. A refrigerating-cycle heat pump purifying device according to claim 1, comprising spaced head members above and beneath said enveloping chambers, and circulation spaces in said head members, in hydraulic connection with said lead and return pipe, and with said enveloping chambers, for having said high thermal capacity fluid circulating through said enveloping chambers.

5. A refrigerating-cycle heat pump purifying device for condensable gaseous mixtures circulating in a dry cleaning plant, comprising:

a pipe coil, in which said gaseous mixture can circulate;

a series of enveloping chambers, in which portions of said pipe coil are housed;

a refrigerating unit including a compressor, a condenser and an evaporator;

a main duct serially connecting said condenser, said evaporator and said compressor for circulating a refrigerating fluid;

a tank for housing said evaporator;

a delivery and return piping for connecting a high thermal capacity fluid in said tank with said enveloping chambers;

a pump on said delivery pipe, for pumping the fluid from said tank into said chambers and for having said fluid returned through said return pipe to said tank;

spaced head members above and beneath said enveloping chambers, and circulation spaces in said head members, in hydraulic connection with said lead and return pipe, and with said enveloping chambers, for having said high thermal capacity fluid circulating through said enveloping chambers;

a heat exchanging chamber housing the end portion of said pipe coil and said condenser, in which chamber said high thermal capacity fluid is contained, said fluid being heated by said condenser and yielding heat to said end portion of said coil;

defrosting coils arranged and immersed in said high thermal capacity fluid in said enveloping chambers;

and an additional duct connecting in a parallel arrangement said defrosting coils with said main duct through a commuting valve.

* * * * *